United States Patent

[11] 3,617,151

[72] Inventor Elva J. Scroggins
    Lafayette, La.
[21] Appl. No. 850,895
[22] Filed Aug. 18, 1969
[45] Patented Nov. 2, 1971
[73] Assignee Drilling Well Control, Inc.
    Houston, Tex.

[54] FLUID FLOW CONTROLLING VALVE AND SYSTEM
    3 Claims, 2 Drawing Figs.

[52] U.S. Cl. .................................................. 417/18,
    417/19, 417/22, 417/42, 137/219, 62/172
[51] Int. Cl. .................................................. F04b 49/00
[50] Field of Search .......................................... 417/42, 43,
    279, 280, 282, 293, 300, 18–24; 415/17, 49;
    62/402, 172, 87

[56] References Cited
    UNITED STATES PATENTS

| | | | |
|---|---|---|---|
| 845,063 | 2/1907 | Desper | 137/219 |
| 2,403,332 | 7/1946 | Bevins | 417/300 |
| 2,512,438 | 6/1950 | Ranzi | 415/49 |
| 3,038,318 | 6/1962 | Hanny | 62/402 |
| 3,209,552 | 10/1965 | Garrett | 62/402 |
| 3,252,298 | 5/1966 | Andrews | 62/402 |

Primary Examiner—Carlton R. Croyle
Assistant Examiner—John J. Vrablik
Attorneys—Paul E. Harris and Lee R. Larkin ABSTRACT: A fluid-actuated throttling valve and system for controlling fluid flow through a conduit by operation of the valve. The valve is characterized by having a housing with an inlet and outlet arranged for fluid to flow therethrough and having a valve seat therein for controlling fluid flow therethrough. A mandrel is mounted in the housing and a valve closure assembly is mounted on the mandrel for axial movement thereon, with the mandrel extending through both ends of the valve closure assembly. The mandrel has an enlarged annular portion forming a fixed piston whereby an upstream and a downstream chamber is formed between the closure assembly and the mandrel. The valve closure assembly also supports a ram portion arranged for seating with the valve seat and means are also provided for flowing another fluid to and from the aforesaid chambers to axially move the valve closure means relative to the valve seat for controlling fluid passage through the housing. The system of this invention includes a pair of rotary housings, each of which has an inlet and outlet arranged for flowing fluid therethrough. A rotary impeller wheel is mounted for rotation in each of the housings, with the rate of rotation being related to the flow of fluid through the housings. Coupling means are provided between the rotors for transmitting rotational forces therebetween. Means are included for connecting the inlet and outlet of one of the rotor housings in a first conduit, and a closed loop conduit is connected with the inlet and outlet of the other of said rotor housings. A valve such as that described above is interposed in the closed loop conduit for controlling the flow of the controlled fluid therethrough, thereby controlling the rate of speed of rotation of the impeller wheels and the flow of fluid through the first conduit.

Elva J. Scroggins
INVENTOR

BY Lee R. Larkin
ATTORNEY

Elva J. Scroggins
INVENTOR

BY Lee R. Larkin
ATTORNEY

FLUID FLOW CONTROLLING VALVE AND SYSTEM

BACKGROUND OF THE INVENTION

1. Field of the Invention

This invention relates to a fluid actuated throttling valve and system for controlling fluid flow through a first conduit. More particularly, the invention is directed to a throttling valve within the flow stream of a conduit which, when activated for either closing or opening does not present to the flow stream any change in the volume which it displaces, nor does it depend upon the controlled fluid for activating fluid. The system is arranged for the regulation of a fluid flow through a conduit and which system includes a valve of the aforesaid type.

2. Description of the Prior Art

Many prior art throttling valves have been developed which are responsive to and actuated by the controlled fluid, but none of them is arranged such as to have a constant volume of displacement thereto. The following patents are generally illustrative of the prior art valves: U.S. Pat. Nos. 845,063; 1,362,331; 1,679,774; 1,752,439; 3,113,583; 3,359,997; 1,321,750; 1,321,751; 1,483,991 and 1,550,717.

It is also desirable to have a device for controlling the fluid flow through a conduit which can provide either constant upstream pressure, constant downstream pressure, or constant volume flow through the conduit. In carrying out such control, it is desirable to have a valve providing a constant volume of operating fluid or control fluid such that no reservoir is required for such control fluid. One advantage of having such a valve is that maintenance of control fluid characteristics is made easier by elimination of the possibility of contamination by entrainment of foreign materials such as dirt or water. Further, since no reservoir is required with such a valve, air may be purged from the system and the control fluid maintained under positive pressure to minimize cavitation effects on the control fluid. Further, the human aspect of assuring that makeup fluid is maintained is also eliminated.

SUMMARY OF THE INVENTION

It is therefore an object of this invention to provide an improved throttling valve and system for controlling fluid flow through a conduit.

The throttling valve of this invention includes a housing having an inlet and outlet arranged for flow of fluid therethrough and a valve seat arranged in fluid flow-controlling relationship therein. A mandrel is mounted in the housing and a valve closure assembly is mounted on the mandrel. The assembly has an axial bore therethrough and is arranged to receive the mandrel therein at axial flooding relationship, with the mandrel extending out both ends of the assembly. The axial bore through the assembly has an enlarged diameter portion intermediate the ends thereof forming an annular cavity between the closure assembly and the mandrel. Means associated with the valve closure assembly and the mandrel are also provided for separating the annular cavity into an upstream chamber and a downstream chamber whereby fluid pressure applied to one of said chambers moves the closure assembly in one direction relative to the mandrel and fluid pressure applied to the other of said chambers moves the closure assembly in the opposite direction relative to the mandrel. The valve closure assembly also supports valve closure means adjacent to the valve seat for seating therewith in fluid flow controlling relationship. The valve also includes means for flowing another fluid to and from the chambers to axially move the closure assembly and the valve closure means relative to the mandrel and the valve seat for controlling fluid passage through the valve housing.

In the preferred embodiment the ends of the axial bore of the closure assembly are of substantially the same diameter whereby the closure assembly, when activated, provides no change to its displaced volume during operation of the valve. Further, the means associated with the closure assembly and the mandrel for separating the annular cavity into an upstream chamber and a downstream chamber is preferably in the form of an annular enlarged portion connected to the mandrel forming a fixed piston arranged for relative movement with the closure assembly. Further, the preferred form of the valve is to have the valve seat arranged adjacent to inlet end of the housing whereby the valve closure means is moved upstream thereagainst.

The system of this invention for controlling fluid flow through a first conduit comprises a pair of rotary housings, each of which has an inlet and outlet arranged for flowing fluid therethrough. A rotary impeller wheel is mounted for rotation in each of the housings, with the rotation being related to the flow of fluid through the housings. Coupling means are provided between the rotors for transmitting rotational forces therebetween, whereby each of the rotors rotates at a rate of speed proportional to the rate of the speed of rotation of the other rotor. Means are also included for connecting the inlet and outlet of one of the rotor housings in the first conduit. The system also includes a closed loop conduit connected with the inlet and outlet of the other of the rotor housings and arranged for circular flow of a control fluid therethrough at predetermined times. The system also includes a valve of the type described above, which valve is interposed in the closed loop conduit for controlling the flow of the control fluid therethrough and thereby controlling the rate of speed of rotation of the impeller wheels and the flow of fluid through the first conduit.

In the preferred embodiment of the system, the inlet of one of the rotary housings is tangential to the rotary wheel therein and the inlet of the other of said rotary housings is axial to the rotor wheel therein. Means may also be provided for sensing the fluid pressure in the first conduit and/or means for sensing the rate of rotation of the rotor wheels, and controller means responsive to the sensing means for controlling operation of the valve.

DESCRIPTION OF THE DRAWINGS

Reference to the drawings will further explain the invention wherein like numbers refer to like parts and in which.

DESCRIPTION OF THE PREFERRED EMBODIMENTS

Figure 1:
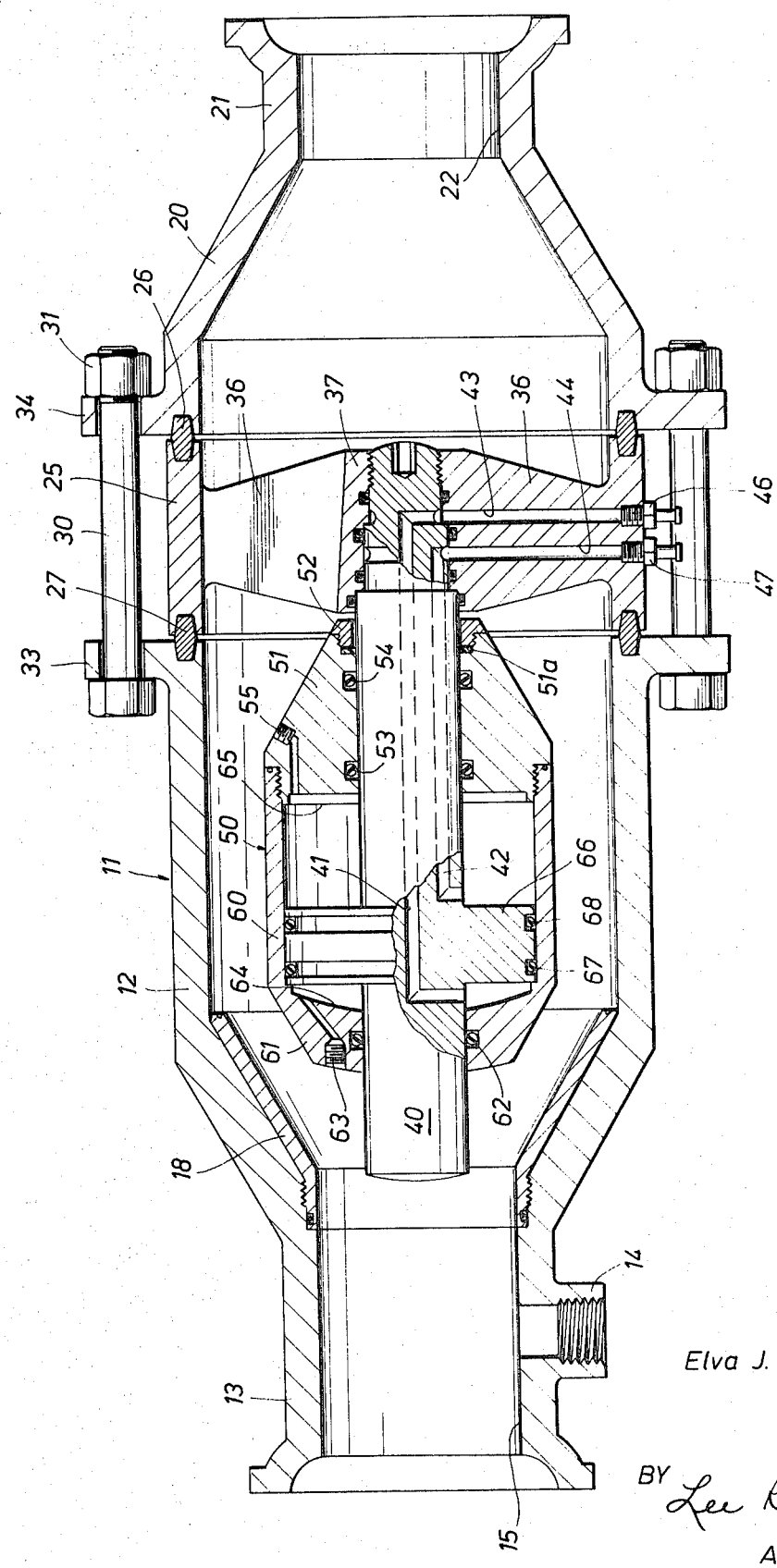
FIG. 1 is a generally central sectional view of one presently preferred embodiment of the valve of this invention.

Referring now to FIG. 1, the valve of this invention includes a valve housing generally designated by the numeral 11 which is comprised of an upstream section 12 having an upstream coupling portion 13 with a pressure sensor connector 14 leading thereinto. Coupling portion 13 forms inlet passage 15 for receiving fluid which is to be passed through valve housing 11. Upstream housing section 12 has an outwardly tapered portion which receives a frustoconical shaped valve seat 18 which is secured thereto as by threads and which is preferably of a wear resistant material. Valve housing 11 also includes a downstream housing section 20 having a coupling portion 21 for connection to a conduit through which the fluid is to be flowed and which forms outlet passage 22.

Interposed between upstream section 12 and downstream section 20 is a spider housing 25 having a pair of ring gaskets 26 and 27 at the ends thereof and sealing with sections 12 and 20. Valve housing 11 is held together by a plurality of bolts 30 and nuts 31 circumferentially spaced about valve housing 11, with the bolts 30 passing through flanges 33 and 34 respectively of sections 12 and 20.

Spider housing 25 includes a plurality of radially extending spider legs 36, the radially inward ends of which connect to spider hub 37, which thereby provides axial openings for the flow of fluid through spider housing 25.

Hub 37 has an axial bore therethrough which is arranged to threadably receive in fixed relationship therewith a mandrel 40, the central axis of which is generally parallel with the longitudinal axis of housing 11 and parallel with the central axis of valve seat 18. The upstream end of mandrel 40 extends to a point adjacent valve seat 18 as shown. Mandrel 40 is provided with a pair of passageways 41 and 42 which respectively communicate with passages 43 and 44 in one of the spider legs 36. Passages 43 terminates in closing connector 46 and passage 44 terminates in opening connector 47. It is to be understood that connectors 46 and 47 are connected to any convenient source of pressurized fluid so that pressure may be increased and decreased through passages 43 and 44 at predetermined times.

The invention also includes a valve closure assembly generally designated by the numeral 50 which is arranged for axial movement relative to mandrel 40 and is supported thereby. Closure assembly 50 includes a generally cone-shaped bushing 51 having retainer ring 52 threaded thereinto, with such retainer ring 52 holding between it and the bushing 51 a mandrel-wiping ring 51A, such mandrel-wiping ring 51A being of a resilient material stretchably circumventing the mandrel 40 to provide wiping action and protection for the seals 53 and 54. Bushing 51 and retainer ring 52 are arranged for receiving mandrel 40 therethrough in sealing and sliding engagement therewith, with said sealing being provided by the pair of O-ring seals 53 and 54. Bushing 51 is also provided with a purging plug 55 for flowing fluid into and out of closure assembly 50 when removed.

Closure assembly 50 also includes an upstream portion 60 which is generally cup-shaped and threadably connected with bushing 51 as shown and which forms an annular cavity with respect to mandrel 40. Upstream portion 60 has connected or supports at the upstream end thereof a frustoconical shaped ram portion 61, which may be of a wear resistant material and which is arranged for seating with valve seat 18 and for controlling fluid flow therethrough. Ram portion 61 has an axial bore or opening therethrough which is substantially the same diameter as the bore through bushing 51 and receives mandrel 40 therethrough, as shown, for sliding movement therewith in sealing relation, which sealing is provided by O-ring seal 62. Ram portion 61 is also provided with a purge plug 63 which is used to flow fluids to and from the annular cavity formed between closure assembly 50 and mandrel 40, when removed.

Means are also provided which are associated with valve closure assembly 50 and mandrel 40 for separating the annular cavity therebetween into an upstream or closing chamber 64 and a downstream or opening chamber 65, which means are conveniently shown in the form of a radially enlarged portion 66 attached to mandrel 40, and having a pair of O-ring seals 67 and 68 thereabout which sealingly and slidingly engage the enlarged bore of upstream portion 60 of closure assembly 50, as shown.

During operation of the valve described above, a fluid such as hydraulic fluid is flowed into the chambers 64 and 65 through passageways 41 and 42 with air being purged therefrom by removing plugs 55 and 63 and thereafter replacing the same. Coupling portions 13 and 21 are connected in a conduit through which the fluid flow is to be controlled. The control of fluid through the valve is maintained by the relationship of ram portion 61 with respect to valve seat 18. In order to close flow through the valve, closure assembly 50, and hence ram portion 61, is moved to the left, as viewed in FIG. 1, by the application of fluid pressure to closing chamber 64 via passageway 41, while at the same time relieving fluid from opening chamber 65 via passageway 42. Conversely, opening of the valve is effected by moving closure assembly 50, and hence ram portion 61, to the right as viewed in FIG. 1 and away from valve seat 18. This is accomplished by the application of hydraulic fluid to opening chamber 65 via passage 42, while at the same time relieving hydraulic fluid from closing chamber 64 via passageway 41. During such opening and closing, closing assembly 50 slides axially relative to mandrel 40. It will be noted that during operation of the valve, the annular volume between closure assembly 50 and valve housing 11 remains constant. This constant volume is maintained because of the arrangement whereby mandrel 40 extends through both ends of closure assembly 50, with mandrel 40 being of equal diameter on both ends.

Figure 2:
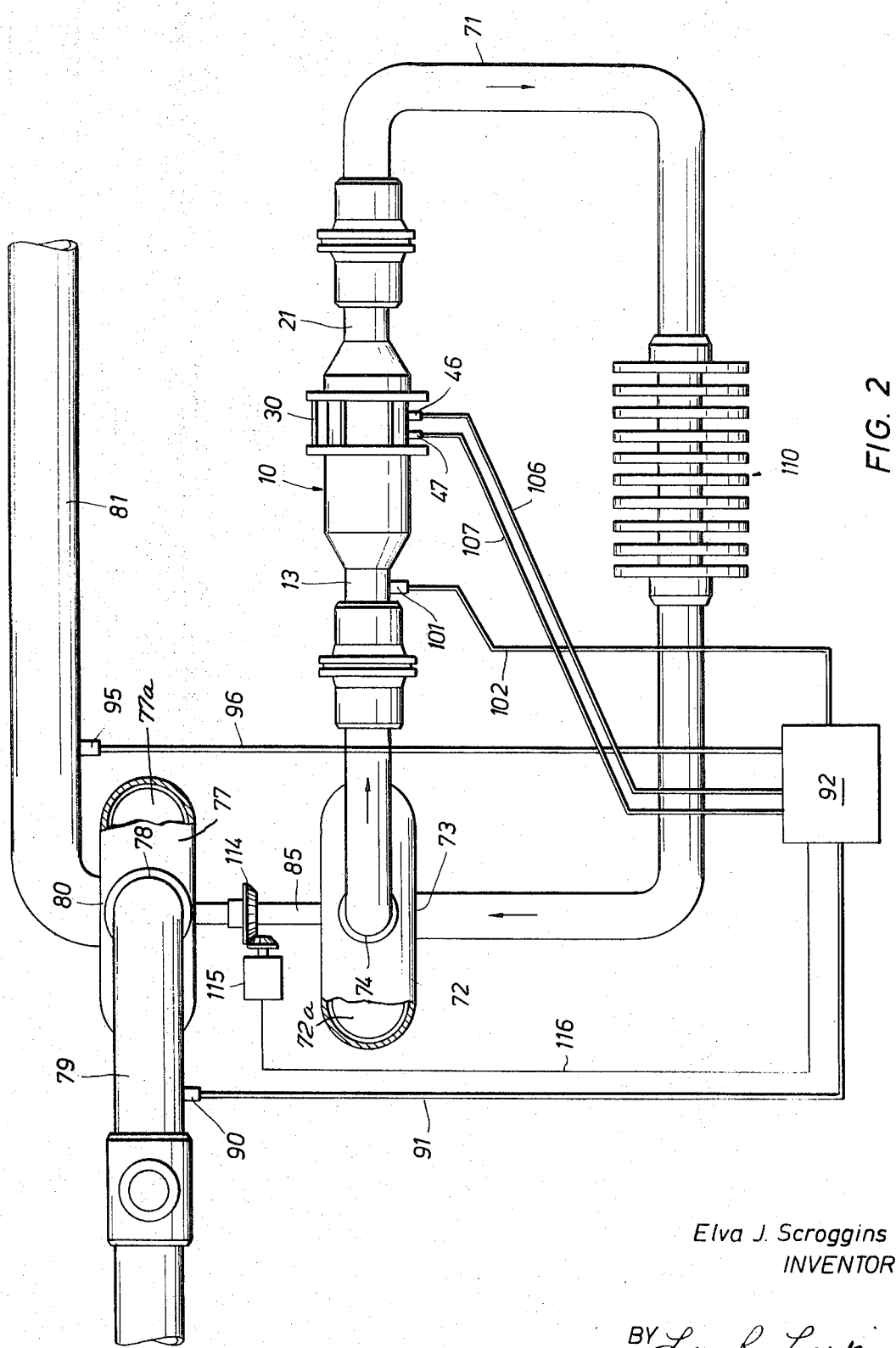
FIG. 2 is a generally top plan view in somewhat schematic form of one presently preferred form of the system of this invention.

Referring now to FIG. 2, a preferred form of the system utilizing the aforesaid valve will now be described. The throttling valve 10 of the type described above is connected in a closed loop conduit generally designated by the numeral 71 which is arranged for the circular flow of a control fluid therethrough in the direction of the arrows shown. The closed loop conduit 71 includes a first rotary impeller housing 72 having a conventional rotor wheel 72a mounted therein having conventional radially extending vanes such as is common to centrifugal pumps and the like. Housing 72 has an axial inlet 73 and a tangential outlet 74, the latter of which leads to the inlet end of valve 10 as shown.

The system also includes another rotary impeller housing 77 having a tangential inlet 78 which connects with an inlet pipe 79 which forms part of the conduit through which fluid flow is to be controlled, as for example the return mud pipe from a drilling well and in which it is desirable to control either the volume or, more preferably, the amount of back pressure thereon. Rotary impeller housing 77 is also provided with an axial outlet 80 which connects to discharge pipe 81 for discharging the fluid therefrom. Rotary housing 77 is also provided with a rotor wheel 77a the same as rotary housing 72.

Coupling means are provided between rotors 72a and 77a in rotary housings 72 and 77, respectively, whereby each of the rotors rotates at a rate of speed proportional to the rate of speed of the other rotor. These coupling means conveniently take the form of a common shaft 85 on which each of the aforesaid rotors is mounted for rotation therewith.

The system also may include means for sensing the pressure of fluid in inlet pipe 79, discharge pipe 81 and loop 71 upstream from valve housing 11, which sensing means is connected to controller means responsive thereto for controlling operation of throttling valve 10 interposed in closed loop conduit 71. These sensing means are in the form of an upstream sensor 90 which is arranged to sense the pressure in inlet pipe 79 and transmit a proportional signal on line 91 to controller 92.

The sensing means may also include a downstream sensor 95 which is arranged to sense the pressure in discharge pipe 81 and transmit a proportional signal on line 96 to controller 92. In addition, a sensor 101 may be coupled to connector 14 of coupling portion 13 of valve housing 11 and arranged to transmit a proportional signal on line 102 to controller 92. Connectors 46 and 47 are respectively connected to hydraulic lines 106 and 107 which also lead to controller 92.

Closed loop conduit 71 may also be provided with heat dissipator means in the form of heat exchanger 110 having a plurality of flanges for dissipating heat and thereby controlling the temperature of the control fluid circulating through loop conduit 71.

In certain instances, it may be desirable to control the volume of flow through inlet pipe 79 rather than the pressure, in which instance shaft 85 may be provided with a bevel gear 114 which is arranged to rotate the matching bevel gear of tachometer 115, which is arranged to provide an output signal on line 116 to controller 92.

With the system assembled as shown in FIG. 2, fluid pressure inlet pipe 79 can be maintained at the desired level by controlling the operation of throttling valve 10. Throttling valve 10 is controlled by operation of controller 92, which may be either manual or automatic in response to the various sensing means described above, whereby hydraulic pressure is applied and relieved through lines 106 and 107 to cause opening and closing of valve 10 as described above.

Fluid flowing through inlet pipe 79 is tangentially applied to rotor 77a in rotary housing 77 causing rotor 77a to rotate and causing shaft 85 and rotor 72a in rotary housing 72 to also rotate. Rotation of rotor 72a in rotary housing 72 propels the fluid in closed loop conduit 71 in the direction of the arrows therein. By operation of throttling valve 10, the rate of flow of the control fluid therethrough acts as a braking force on rotor 72a in rotary housing 72, which in turn is applied to rotor 77a in rotary housing 77, thereby limiting or controlling the flow of fluid through inlet pipe 79 and discharge pipe 81. By completely shutting throttling valve 10, flow through inlet pipe 79 can be completely terminated or, alternatively, can be controlled to the desired extent, whereby back pressure can be applied on inlet pipe 79. Such operation might be useful, for example, in controlling the outlet pressure from a drilling well wherein back pressure is desired to be maintained on the well.

As a result of the foregoing relationships, opening of throttling valve 10 will permit increased flow through inlet pipe 79 and rotary housing 77. As stated above, control can be exercised as to constant upstream pressure, constant downstream pressure, or constant volume. Should constant pressure be the desired mode (either upstream or downstream), pressure sensor 90 or 95 feeds the pressure change to controller 92, which in turn applies hydraulic action to throttling valve 10 to bring the pressure in inlet pipe 79 to the desired pressure level.

If constant volume flow through inlet pipe 79 is desired, then the tachometer signal generated by tachometer 115 is utilized by controller 92 to maintain the flow of fluid through throttling valve 10 so as to maintain constant speed of rotation of the rotor wheels.

To assist in continued observance of throttling valve 10, sensor 101 is utilized to apply a signal to controller 92. The pressure developed between vanes of the rotor wheel 72a in rotary housing 72 and the pressure sensed by pressure sensor 102 will be in direct relationship to the pressure in inlet pipe 79 and will be proportional as to the sizes of the two rotor wheels.

It will be seen that throttling valve 10 is designed to operate either individually or as a part of the system such as is shown in FIG. 2. The system shown in FIG. 2 provides an arrangement whereby control fluid within loop conduit 71 will circulate in a continuous fluid column upon itself as regulated by throttling valve 10 and without any loss of control fluid, and hence no necessity for control fluid makeup. Such a system requires no reservoir from which control fluid is withdrawn and replaced. The "solid" column of control fluid is desirable for the reasons cited above. The system as shown in FIG. 2 can be adopted to many uses, as for example, a pressurized wellhead permitting controlled discharge to the atmosphere, one leg of a mixing system, or controlled hydraulic force application into a piece of equipment such as a press or forge, for example.

The foregoing description is to be construed as illustrative only, and further modifications and alternate embodiments of the invention will be apparent to those skilled in the art in view of this description.

What is claimed is:

1. In a system for controlling fluid flow through a first conduit, the combination comprising:
    a pair of rotor housings, with each of said housings having an inlet and outlet arranged for flowing fluid therethrough;
    a rotary impeller wheel mounted for rotation in each of said housings with said rotation being related to the flow of fluid through said housings;
    coupling means between said rotors for transmitting rotational forces therebetween, whereby each of said rotors rotates at a rate of speed proportional to the rate of speed of rotation of the other rotor;
    one of said rotor housings being connected in said first conduit to allow fluid in said conduit to flow therethrough;
    a closed loop conduit connected with the inlet and outlet of the other of said rotor housings and arranged for circular flow of a control fluid therethrough at predetermined times;
    a valve interposed in said closed loop conduit for controlling the flow of said control fluid therethrough, and thereby controlling the rate of speed of rotation of said impeller wheels and the flow of fluid through said first conduit;
    said valve including:
        a valve housing having an inlet and an outlet arranged for flow of said control fluid therethrough, and a valve seat arranged in fluid flow controlling relationship therein;
        a mandrel mounted in said housing;
        a valve closure assembly having an axial bore therethrough and arranged to receive said mandrel therein in axial sliding relationship therewith, with said axial bore having an enlarged diameter portion intermediate the ends thereof forming an annular cavity between said closure assembly and said mandrel;
        means associated with said valve closure assembly and said mandrel for separating said annular cavity into an upstream chamber and a downstream chamber whereby fluid pressure applied to one of said chambers moves said assembly in one direction relative to said mandrel, and fluid pressure applied to the other of said chambers moves said assembly in the opposite direction relative to said mandrel;
        a valve closure means connected with said assembly and supported adjacent said valve seat for seating in fluid flow controlling relationship therewith;
        and, means for flowing another fluid to and from said chambers to axially move said assembly and said valve closure means relative to said mandrel and said valve seat for controlling fluid passage through said valve housing.

2. The invention as claimed in claim 1 including:
means for sensing the pressure of fluid in said first conduit and in said loop conduit;
and, controller means responsive to said sensing means for controlling operation of said valve.

3. The invention as claimed in claim 1 including:
means connected with said coupling means for sensing the rate of rotation of said rotor wheels;
and, controller means responsive to said sensing means for controlling operation of said valve.

* * * * *